April 30, 1929.  P. H. McNELLES  1,711,321
AUTOMOBILE BRAKE
Filed March 14, 1927  4 Sheets-Sheet 1

INVENTOR.
PHILIP H. McNELLES
BY
ATTORNEY.

April 30, 1929.  P. H. McNELLES  1,711,321
AUTOMOBILE BRAKE
Filed March 14, 1927  4 Sheets-Sheet 3

INVENTOR.
PHILIP H. McNELLES
BY
ATTORNEY.

April 30, 1929.

P. H. McNELLES 1,711,321

AUTOMOBILE BRAKE

Filed March 14, 1927

INVENTOR.
PHILIP H. McNELLES
BY
ATTORNEY.

Patented Apr. 30, 1929.

1,711,321

UNITED STATES PATENT OFFICE.

PHILIP H. McNELLES, OF DETROIT, MICHIGAN.

AUTOMOBILE BRAKE.

Application filed March 14, 1927. Serial No. 175,108.

This invention relates to automobile brakes and the object of the invention is to provide a double brake operating simultaneously on the internal and external faces of the brake drum.

Another object of the invention is to provide a means for operating the brake consisting in a means for moving two brake shoes outwardly to contact the inner face of the brake drum, the same actuating mechanism drawing two outer brake shoes inwardly to contact the external face of the brake drum.

Another object of the invention is to provide a series of arcuate brake shoes so arranged that the wear does not come at any one point but is distributed evenly over the faces of the brake shoes.

Another object of the invention is to provide an automobile brake of the character described adapted to be actuated mechanically or by hydraulic pressure as desired.

A further object of the invention is to provide a brake operating on the internal and external faces of a brake drum simultaneously upon application of the brake.

A further object of the invention is to provide a means for moving the outer and inner sets of brake shoes in opposite directions by movement of a single lever.

These objects and the several novel features of the invention are hereinafter more fully described and claimed and the preferred form of construction by which these objects are attained is shown in the accompanying drawings in which—

Fig. 6 is a section taken on line 6—6 of Fig. 3.

Fig. 8 is a section taken on line 8—8 of Fig. 2.

Figure 1:
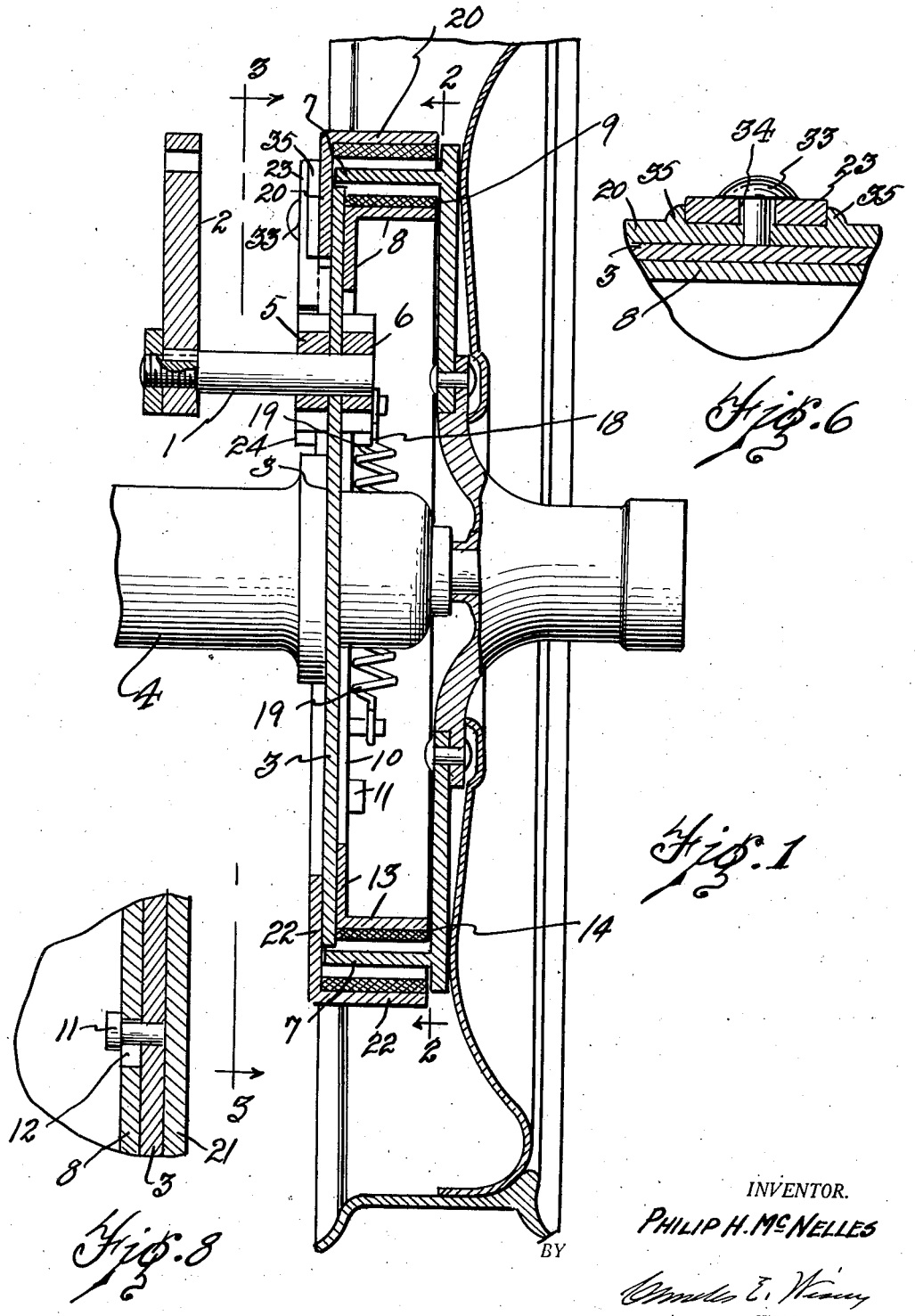
Fig. 1 is a vertical section through an automobile wheel and brake embodying my invention.
Figure 2:
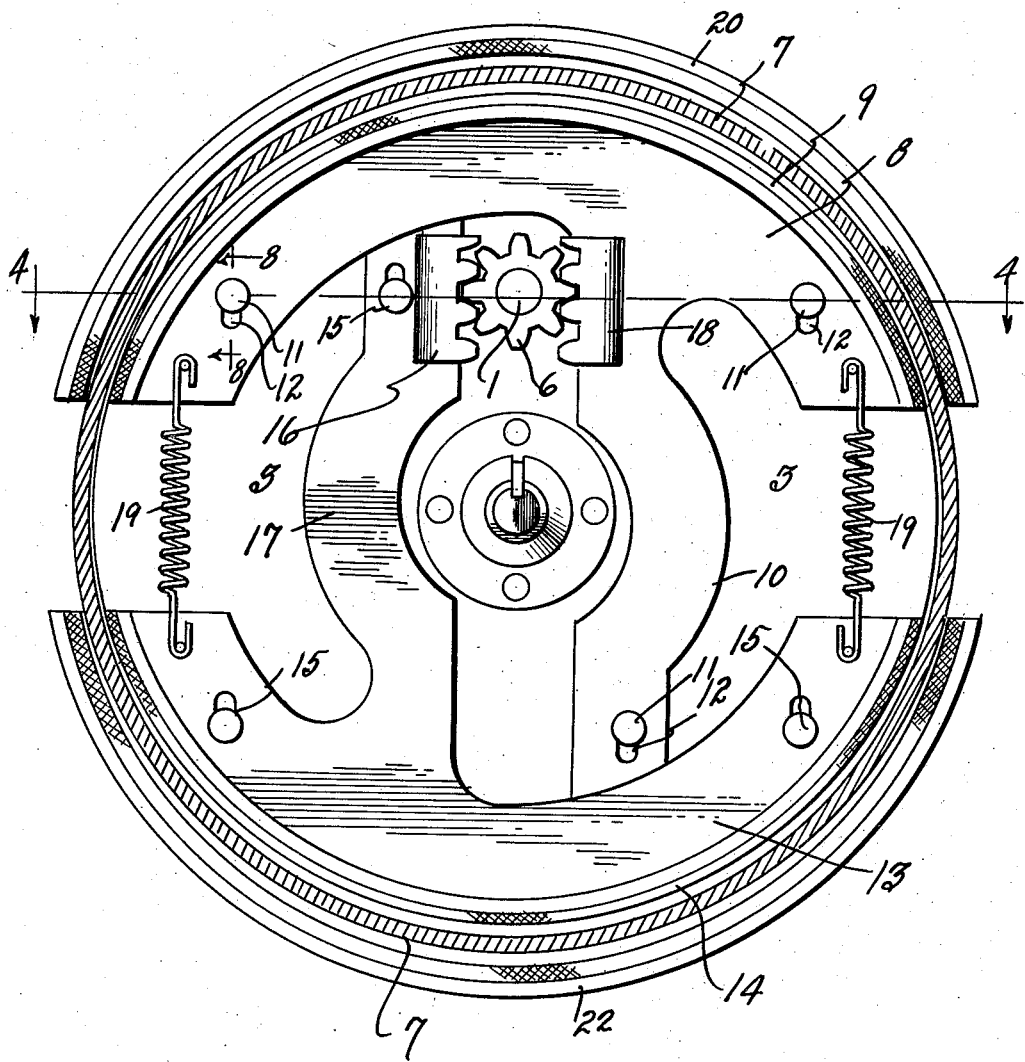
Fig. 2 is a section taken on line 2—2 of Fig. 1.
Figure 5:
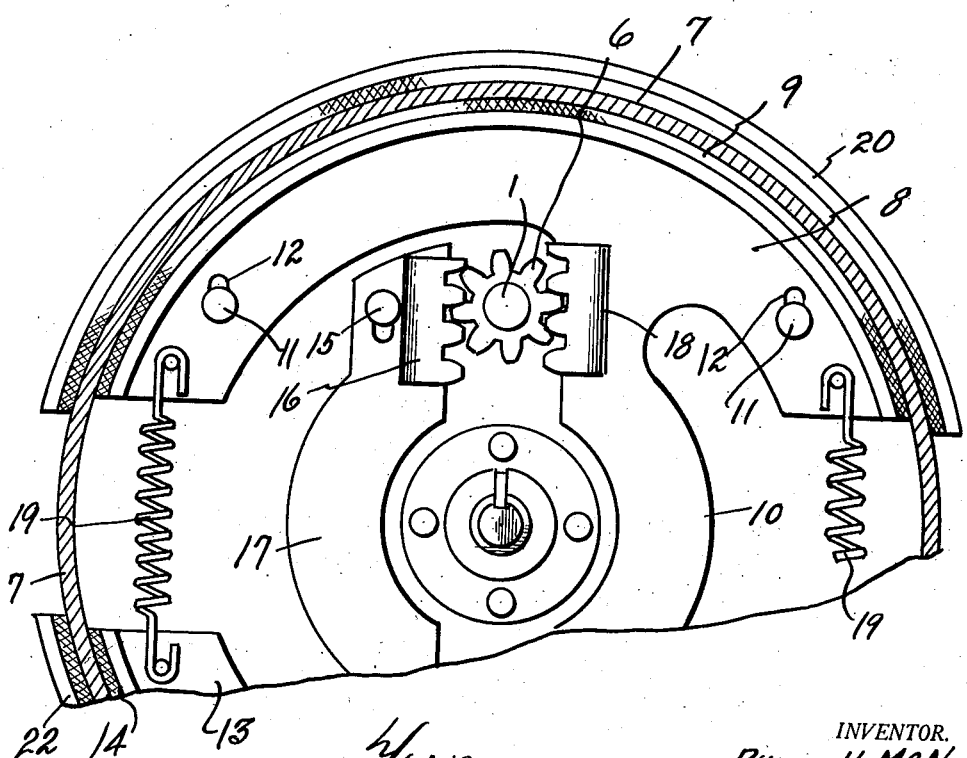
Fig. 5 is a partial section similar to Fig. 2 showing the brake shoes in braking position.

As shown in Fig. 1 the brake is adapted to be actuated by a rod 1 which may be turned by means of a lever 2 which is fixedly secured to the rod 1. The rod 1 extends through a stationary plate 3 which is secured to the axle housing 4. Two sprockets 5 and 6 are secured to the rod 1 on opposite sides of the plate 3 and provide means for actuating the brake. The wheel may be either a wood or wire spoke wheel or a disc wheel as shown in which the brake drum 7 is secured to rotate with the wheel. The interior of the drum is shown in Fig. 2 and a brake shoe 8 is provided having a brake lining 9 and having an extending end 10. A series of three pins 11 are secured in the plate 3 and extend through slots 12 in the brake shoe 8 so that the brake shoe may be moved upwardly on the pins 11 to apply the brake lining 9 to the inner face of the drum. The other brake shoe 13 is provided with a brake lining 14 and is slidable in the same manner on the pins 15 which are secured in the stationary plate 3. By a downward movement of the brake shoe 13 the brake lining 14 is also applied to the inner face of the brake drum 7. A rack 16 is secured to the extending end 17 of the brake shoe 13 and a rack 18 is secured to the extension 10 of the brake shoe 8. These racks both mesh with the sprocket gear 6 so that upon turning the sprocket gear 6 in a counter clockwise direction the brake shoe 13 is moved downwardly while the brake shoe 8 is moved upwardly. This movement of the sprocket 6 is accomplished by turning the rod 1 by means of the lever 2 which moves the brake shoes 8 and 13 apart to apply the brake. In order to return the brake shoes to the inoperative position shown in Fig. 2 a pair of springs 19 are provided connecting the ends of the brake shoes and tending to draw the brake shoes toward the center of the wheel. The internal brakes are shown in position for applying the brake in Fig. 5.

Figures 3, 7:
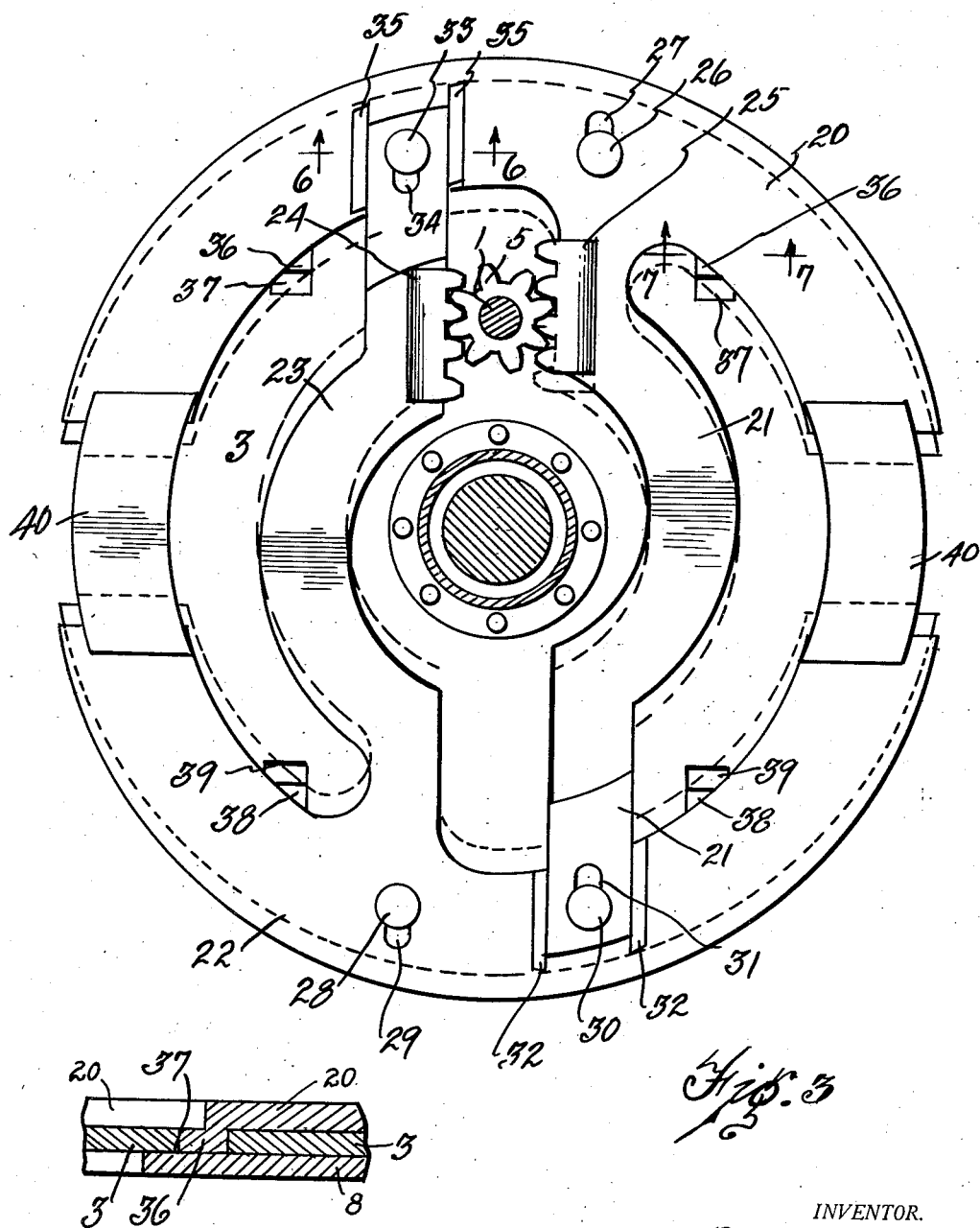
Fig. 3 is a section taken on line 3—3 of Fig. 1.
Fig. 7 is a section taken on line 7—7 of Fig. 3.
Figure 4:
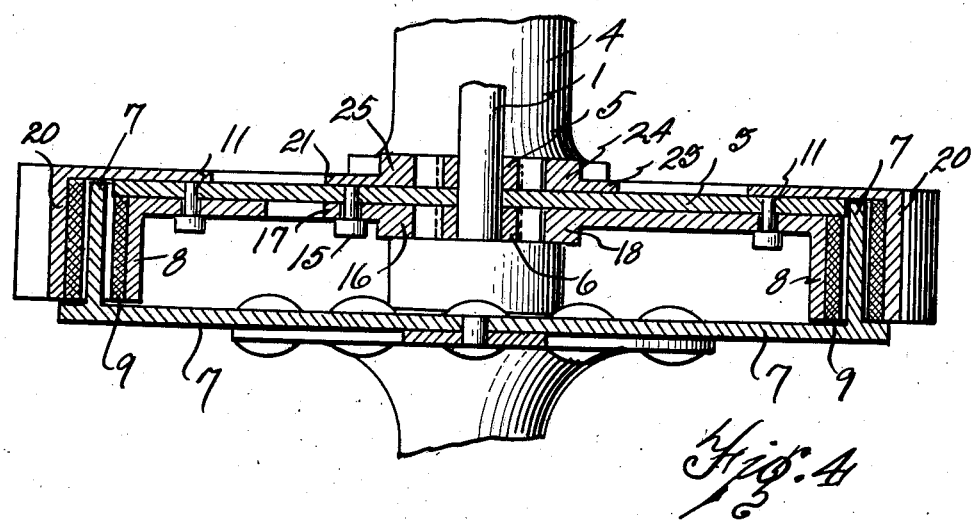
Fig. 4 is a section taken on line 4—4 of Fig. 2.

The outer brake shoes are shown more particularly in Fig. 3 in which the brake shoe 20 is arcuate in form and is provided with an extending end 21 and the brake shoe 22, which is similar to the brake shoe 20, is provided with an extending arm 23. A rack 24 is secured to this arm 23 while a rack 25 is secured to the arm 21 of the brake shoe 20. Both of these racks 24 and 25 mesh with the sprocket 5 on the rod or shaft 1. By this arrangement upon rotation of the sprocket 5 in a clockwise direction the rack 24 is moved upwardly thus drawing the outer brake shoe 22 into contact with the outer face of the brake drum and at the same time the rack 25 is moved downwardly to draw the outer brake shoe 20 into contact with the outer face of the brake drum. In order to guide the brake shoes in their movement a pin 26 is secured in the stationary plate 3 and extends through a slot 27 in the brake shoe 20. A similar pin 28 is secured in the plate 3 and extends through a slot 29 in the lower brake shoe 22 shown in Fig. 3. A pin 30 is secured in the brake shoe 22 and extends through a slot 31 in the arm 21 of a brake shoe 20. The brake shoe 22 is also provided with two guides 32 for the arm 21. The upper brake shoe 20 is provided with a pin 33 extending through a slot 34 in the arm 23 of the brake shoe 22 and the brake shoe 20 is provided with guides 35 for the arm 23. The brake shoe 20 is also provided with lugs 36 on the inner face riding in the slots 37 in the stationary plate 3 and the brake shoe 22 is provided with lugs 38 on the inner face thereof riding in the slots 39 in the plate 3 as it will be more readily understood from Figs. 3 and 7. Two members 40 are secured to opposite sides of the plate 3 and are under cut as shown in dotted lines to provide guides for the ends of the brake shoes 20 and 22. With this arrangement both brake shoes 20 and 22 are guided in their movement to apply the brake.

The lever 2 shown in Fig. 1 may be operated by a hydraulic means or mechanical means as desired. When the sprockets 5 and 6 are turned by means of the lever 2 and rod 1 the inner brake shoes are moved outwardly and the outer brake shoes are moved inwardly to grip the brake drum. Upon release of the brake the springs 19 draw the inner brake shoes away from the brake drum toward the center of the wheel thus turning the sprocket 6 which is secured to the rod 1 and thus the sprocket 5 is turned to move the outer brake shoes apart away from the brake drum.

By the use of the two shoes which are moved diametrically of the brake drum the pressure applied in actuating the brake is uniform throughout the surfaces of the brake shoes and therefore the brake linings will wear uniformly and will not tend to wear through at any one point which is a fault of the usual brake which surrounds the drum in which the two ends of the brake band are drawn together to apply the brake.

From the foregoing description it becomes evident that the device is very simple and efficient in operation, will provide a brake of maximum power which will not easily get out of order and provides a device which accomplishes the objects described.

Having thus fully described my invention, its utility and mode of operation, what I claim and desire to secure by Letters Patent of the United States is—

1. In an automobile brake, a brake drum, a pair of arcuate outer brake shoes positioned in spaced relation with the outer face of the brake drum, a pair of arcuate inner brake shoes positioned in spaced relation with the inner face of the brake drum, a toothed rack on each brake shoe, a sprocket meshing with the racks of the outer brake shoes and adapted upon rotation to move the outer brake shoes in opposite directions, a second sprocket meshing with the racks of the inner brake shoes and adapted upon rotation to move the inner brake shoes in opposite directions and a common shaft to which both sprockets are secured.

2. In an automobile brake, a stationary plate adapted to be secured to an axle housing, a brake drum adapted to be secured to an automobile wheel, a pair of outer brake shoes slidably mounted on the stationary plate and extending over the outer face of the brake drum, a pair of inner brake shoes slidably mounted on the stationary plate within the brake drum, a toothed rack secured to each brake shoe, a sprocket meshing with the racks on the inner brake shoes, a second sprocket meshing with the racks on the outer brake shoes and a shaft rotatable in the stationary plate to which the sprockets are secured.

3. In an automobile brake, a brake drum, a pair of outer brake shoes positioned in spaced relation with the outer face of the brake drum, a pair of inner brake shoes positioned in spaced relation with the inner face of the brake drum, a toothed rack on each brake shoe, a sprocket meshing with the racks of the outer brake shoes, a second sprocket meshing with the racks of the inner brake shoes and a rotatable shaft to which both sprockets are secured.

4. In an automobile brake, a stationary plate adapted to be secured to an axle housing, a brake drum secured to the automobile wheel adjacent the plate, a pair of outer brake shoes slidably mounted in diametrically opposed relation on the exterior face of the plate and extending over the outer face of the drum, a pair of inner brake shoes slidably mounted in diametrically opposed relation on the inner face of the plate within the brake drum, a toothed rack secured to each brake shoe, the racks of the inner shoes on the inner side of the plate being in opposed relation on one side of the axle housing and the racks of the outer shoes being secured in alignment therewith on the same side of the axle and on the opposite side of the plate, a shaft supported in the plate between opposed pairs of racks, and gear means attached to the shaft and meshing with each of the racks providing an arrangement whereby rotation of the shaft in either direction causes corresponding movement of the shoes.

In testimony whereof I sign this specification.

PHILIP H. McNELLES.